Dec. 4, 1962 J. J. KOWALIK ET AL 3,066,468
SICKLE FOR RECIPROCATING MOWER
Filed Sept. 30, 1960

Inventors:
John J. Kowalik
Joseph Syrutowicz
Robert A. Johnson
Paul O. Pippel Atty.

United States Patent Office 3,066,468
Patented Dec. 4, 1962

3,066,468
SICKLE FOR RECIPROCATING MOWER
John J. Kowalik, Glenview, Joseph Syrutowicz, Chicago, and Robert A. Johnson, Downers Grove, Ill., assignors to International Harvester Company, Chicago, Ill., a corporation of New Jersey
Filed Sept. 30, 1960, Ser. No. 59,697
13 Claims. (Cl. 56—301)

This invention relates to mowers of the reciprocating type wherein a sickle operates over a ledger-plate-carrying mower bar and wherein the outboard or free end of the sickle extends through an outer shoe and more specifically the invention appertains to the provision of an end section in substitution of a conventional knife section.

In mowers of the type under consideration a problem occasionally arises particularly in rank or downed forage material in that the end of the sickle which operates through a complementary slot in the outer shoe packs the material into the slot without cutting the material causing plugging and dragging of both cut and uncut material so that eventually it will result in frequent breaking away of the mower bar and also eventually, because the knife section cannot pass through the slot, will result in buckling and breakage of the knife section and/or the knife back.

A general object of the invention is to provide a novel end section of novel configuration which may be substituted for a conventional knife section and wherein the cutting edges are so arranged as to provide a progressive cut of the material as the knife section progresses through the outer end shoe.

A further object of the invention is to provide a novel end section which may be relatively inexpensively manufactured and wherein the section provides almost one and one-half times the cutting edge over the conventional section.

A still further object of the invention is to provide a novel outwardly tapered end section wherein the teeth progress in depth from the outer end toward the inner end of the end section, the innermost tooth being of the same depth as that of a conventional section.

A still further object of the invention is to provide a novel end section which is exceptionally free from clogging and wherein progressive cutting is obtained so as to minimize loading on the sickle.

A still further object of this invention is to provide a novel end section which is free from clogging and permits uninterrupted mowing and thus leaves the field clean and free from bunched or uncut crops.

These and other objects and advantages inherent in and encompassed in the invention will become more readily apparent from the specification and the drawings wherein.

Figure 1:
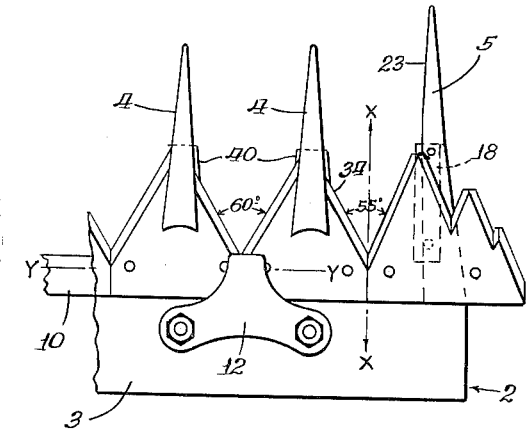
FIGURE 1 is a fragmentary plan view partially broken away illustrating the mower with the end section disposed in its outermost position.
Figure 2:
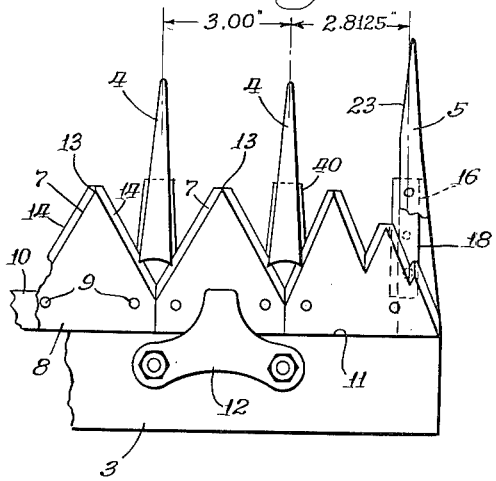
FIGURE 2 is a view similar to FIGURE 1 with parts broken away illustrating the end section in an intermediate position.
Figure 3:
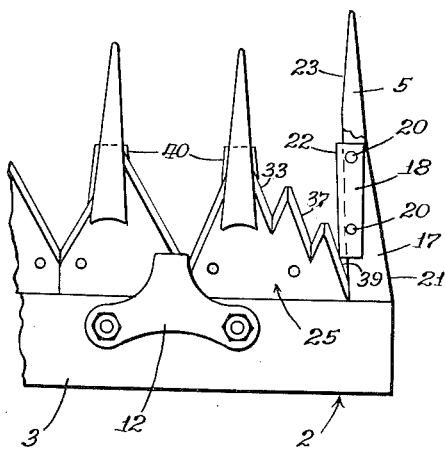
FIGURE 3 illustrates the position of the parts with the end section in its innermost position.
Figure 4:
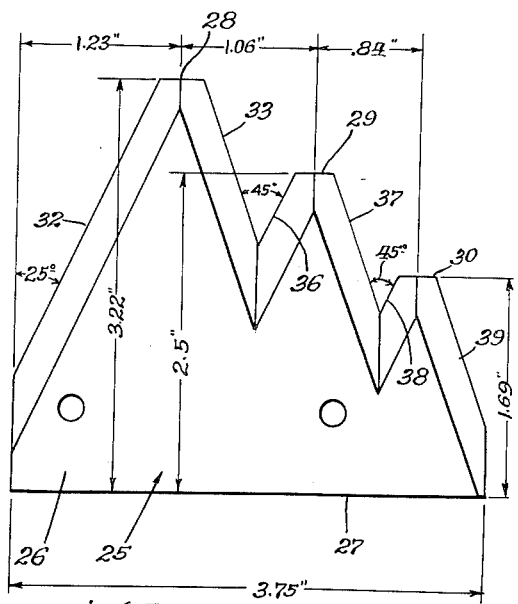
FIGURE 4 is a full-scale plan view of the novel end section.

Describing the invention in detail, there is fragmentarily shown a mower generally designated 2 which comprises a mower bar 3 which support the forwardly projecting guards 4 in the usual manner and the outer end shoe structure or divider 5.

Each finger or guard 4 carries a ledger plate 6 in the usual manner cooperating with the knife parts 7 of the conventional knife section 8 which is preferably riveted at 9, 9 to a backing bar 10 which rides within a channel 11 in the mower bar 3, the knife being held against the bar 3 by means of a plurality of clips 12.

The sections 8 comprise points 13, 13 which are sharpened along their lateral edges 14, 14 the adjacent edges converging rearwardly at a 60° included angle. The length of a normal knife section, including the two points, is three inches and the points are separated from each other 1.5 inches apart.

The spacing between the fingers or the guards 4 and between the last guard and the outer shoe are all the same distance, the outer shoe 5 being provided with a horizontal slot 16 which is defined in part by a bottom surface 17 substantially coplanar with the bottom side of the knife and supporting a ledger plate section 18 which is riveted as at 20 to the bottom portion 21 of the shoe 5. The inner edge 22 of the ledger plate section 18 projects inwardly of the inboard side 23 of the outer shoe and cooperates with the novel three-point end section, generally designated 25.

The end section 25 has a mounting or base portion 26 along its rear part including a substantially straight back edge 27 which cooperates with the ledge 11 of the mower bar 3. The section 25 is substantially a flat plate section of a thickness comparable to conventional sickle sections and comprises an inner point 28, an intermediate point 29, and an outer point 30. The inner point 28 is of normal length or depth which is 3.22 inches, the intermediate point is stepped rearwardly and is 2.5 inches and the outermost point is 1.69 inches from the base edge 27. The inner and outer edges 32, 33 of the point 28 are beveled or sharpened and the edge 32 is disposed to the opposing edge 34 of the next adjacent standard section at an angle of 55°. The edge 34 has an angle of 30° to the line X—X which is normal to the longitudinal center line Y—Y of the mower, and the edge 32 is at 25° to the line X—X of FIGURE 1. The outboard edge 33 is disposed at a 45° angle to the inboard edge 36 of the intermediate point and the outboard edge 37 of the intermediate point is disposed at a 45° angle to the inboard edge 38 of the outermost point 30. The outboard edge 39 is disposed at an angle of 22.5° to the line X—X which is normal of the center line Y—Y of the sickle (FIGURE 1).

It will be seen that the length of the end section is 3.75 inches whereas the normal section is 3.00 inches. The innermost point 28 is spaced 1.23 inches from the next adjacent standard point 7 and the intermediate point 29 is spaced 1.06 inches from point 28 and point 30 is spaced .84 inch from point 29. The distance between the centers of the ledger plates 40, 40 is 3.00 inches. It is 2.8125 inches between the effective centers of ledger 18 and adjacent ledger 40.

It has been determined that the end section of the instant invention present 7.25 inches of cutting edge as against 5 inches of a standard section. Furthermore, the progression in the increase in depth in the points from the outermost to the innermost provides for cutting increments of material as the material gathers within the space between the outermost shoe 5 and the portion of the cutting edge at that moment approaching the ledger plate 18.

What is claimed is:

1. A sickle for reciprocating type mowers, said sickle having a plurality of sections of substantially uniform width, said sickle having an end section of a width greater by about 25% than that of the said sections of uniform width, and said end section having a plurality of stepped cutting portions increasing in height from the end thereof inwardly.

2. The invention according to claim 1 and said cutting portions increasing in width from the end inwardly.

3. The inventions according to claim 1 and said cutting portions being three.

4. The invention according to claim 1 and said cutting portions being three and the innermost portion being of less width than the sum of the widths of the other two portions.

5. The invention according to claim 1 and said portions being inner, intermediate and outer and said inner portion having a height of 3.22 inches, said intermediate portion having a height of 2.5 inches and said outer portion having a height of 1.69 inches.

6. The invention according to claim 1 and wherein the included angle between adjacent portions is in the vicinity of 45°.

7. The invention according to claim 1 and said portions having laterally sharpened edges and comprising three in number and increasing in width from the end thereof inwardly.

8. For use in a sickle for reciprocating type mowers and said sickle having a plurality of sections of substantially uniform width, a sickle end section of a width greater by about twenty-five percent than that of said sections of uniform width, and said end section having a plurality of stepped cutting portions increasing in height from the end thereof inwardly.

9. The invention according to claim 8 and said cutting portions increasing in width from the end inwardly.

10. The invention according to claim 9 and said portions comprising three.

11. For use with a reciprocating-type mower sickle, having a plurality of sections, an end section of greater width than the other sections, said end section having an inner cutting point portion and at least one outer cutting point portion, said outer cutting point portion being of lesser depth than that of said inner cutting point portion.

12. The invention according to claim 11 and said end section having an intermediate cutting point portion of a depth less than that of the inner cutting point portion but greater than that of the outer point cutting portion, and each of said portions having lateral cutting edges.

13. The invention according to claim 11 and each point portion having outboard cutting edges and the outboard cutting edge on the outer point portion being offset rearwardly of the outboard cutting edge of the inner point portion.

References Cited in the file of this patent
UNITED STATES PATENTS

| | | |
|---|---|---|
| 27,323 | Vertrees | Feb. 28, 1860 |
| 477,198 | Champlin | June 21, 1892 |
| 2,909,886 | Stroburg et al. | Oct. 27, 1959 |